United States Patent
Warich et al.

(10) Patent No.: US 7,406,056 B2
(45) Date of Patent: Jul. 29, 2008

(54) UMTS BASE STATION SUPPORTING MULTIPLE TRANSMISSION METHODS

(75) Inventors: Anja Warich, Stuttgart (DE); Michael Jeschke, Stuttgart (DE)

(73) Assignee: ALCATEL, Paris (FR)

( * ) Notice: Subject to any disclaimer, the term of this patent is extended or adjusted under 35 U.S.C. 154(b) by 1163 days.

(21) Appl. No.: 10/307,952

(22) Filed: Dec. 3, 2002

(65) Prior Publication Data

US 2003/0103473 A1 Jun. 5, 2003

(30) Foreign Application Priority Data

Dec. 4, 2001 (EP) ................................. 01440410

(51) Int. Cl.
H04B 7/185 (2006.01)
H04B 7/216 (2006.01)
H04Q 7/00 (2006.01)

(52) U.S. Cl. ........................ 370/318; 370/335; 370/331; 455/522; 455/69

(58) Field of Classification Search ................. 370/338, 370/321, 310, 318, 331, 335; 455/69, 522, 455/127.1, 101
See application file for complete search history.

(56) References Cited

U.S. PATENT DOCUMENTS

| 6,675,016 B2* | 1/2004 | Lucidarme et al. ....... 455/452.2 |
| 6,782,270 B1* | 8/2004 | Jeschke et al. .............. 455/522 |
| 7,020,108 B2* | 3/2006 | Virtanen ..................... 370/331 |
| 7,068,614 B2* | 6/2006 | Zheng .......................... 370/311 |
| 7,072,312 B2* | 7/2006 | Zeira et al. ................... 370/321 |
| 7,133,682 B2* | 11/2006 | Seki et al. .................... 455/450 |

FOREIGN PATENT DOCUMENTS

| EP | 0 949 830 A2 | 10/1999 |
| EP | 949830 | * 10/1999 |
| EP | 1 133 079 A1 | 9/2001 |

OTHER PUBLICATIONS

EP 949830A2 (Ushirokawa et al) power control method and system using idle itme in mobile communcation system.*
"3rd Generation Partnership Project (3GPP); Technical Specification Group Raio Access Network Multiplexing and Channel Coding (FDD) (3G TS 25.212 Version 3.0.0)" 3G TS 25 212 V3.0.0, XX, XX, Pages(s) Complete 54, XP002149187.

* cited by examiner

Primary Examiner—Tilahun Gesesse
(74) Attorney, Agent, or Firm—Sughrue Mion, PLLC

(57) ABSTRACT

The invention has for its object to provide a base station for UMTS which makes it possible to implement the transmission of different transmission methods and of different time-slot types in the simplest possible manner. The base station according to the invention is a so-called node B of a UMTS mobile radio system. It includes a downlink power control unit. This unit is designed to transfer to a so-called chip processing unit for carrying out the CDMA coding at least one unit of information about at least one time-slot type to be transmitted. The downlink power control unit is a processor, for example. The implementation is done by suitable software programming of the processor. Using the received information, the chip processing unit generates a suitable time-slot type for a current time slot. This time-slot type is then CDMA-coded.

6 Claims, 3 Drawing Sheets

UMTS BASE STATION SUPPORTING MULTIPLE TRANSMISSION METHODS

TECHNICAL FIELD

This invention relates to a base station for a UMTS mobile radio system; UMTS=Universal Mobile Telecommunication Standard. The invention is based on a priority application EP 01440410.7, which is hereby incorporated by reference.

BACKGROUND OF THE INVENTION

In UMTS, different transmission methods must be implemented, such as compressed mode, in which predetermined time-slot types must be transmitted in transmission gaps.

The information about the occurrence of compressed mode can be stored, for example, in the chip processing unit within a base station. This has the disadvantage that because of the implementation of the chip processing unit as, e.g., an ASIC, a hardware solution is necessary which is expensive and inflexible, i.e., not subsequently changeable.

SUMMARY OF THE INVENTION

It is an object of the invention to provide a base station for UMTS which makes it possible to implement the transmission of different transmission methods and of different time-slot types in the simplest possible manner.

According to the invention, this object is attained by a base station for a UMTS mobile radio system which serves to transmit CDMA-coded radio signals formatted in time slots, wherein a transmit power control unit is designed to transfer to a processing unit at least one unit of information about a time-slot type to be transmitted.

The base station according to the invention is a so-called node B of a UMTS mobile radio system. In UMTS, signals to be transmitted are formatted in time slots and then coded using CDMA. After a subsequent conversion to radio signals, the latter are transmitted to the mobile stations. The base station includes a unit for controlling the transmit power ("downlink power control"). This unit is designed to transfer to a processing unit for carrying out the CDMA coding at least one unit of information about at least one time-slot type to be transmitted. The unit is a processor, for example, which is suitably programmed, for instance by means of a computer program in the programming language C++. The processing unit is referred to as a chip processing unit. Using the received information, it generates a suitable time-slot type for a current time slot, and this time-slot type is then CDMA-coded.

In a preferred embodiment of the invention, the base station is characterized in that a unit of information is transferred in the form of at least one four-bit combination, with each bit representing one parameter of a time-slot type. A time slot has, for instance, the parameters DATA1+2, TPC, TFCI, PL. By setting or not setting a parameter, different time-slot types can be generated. These are used, for example, to implement the different time-slot types of compressed mode and/or SSDT. With four bits, 16 different time-slot types can be implemented. Instead of using one bit for DATA1+2, it is also possible to use two bits, one for DATA1 and an additional one for DATA2. Thus, DATA1 or DATA2 or DATA1+2 or no data can be transmitted. By means of five bits, 32 different time-slot types can be implemented.

In another preferred embodiment of the invention, the base station is characterized in that a unit of information is transferred in the form of at least one two-bit combination, with each bit combination representing a different time-slot type. The information is transmitted in coded form. A two-bit combination corresponds to a given time-slot type, containing, e.g., TPC or PL.

Advantageously, at least five different time-slot types are provided. Thus, compressed mode and SSDT as well as downlink control are realizable by a single programming process. The transmit power control unit thus takes over the central function of controlling and signaling three different transmission methods. The unit has an interface to the uplink control and receives via this interface the information for SSDT and downlink control.

Advantageously, each unit of information is transferred in the form of at least one two-bit combination and together with power control bits. By appending the bit combination to the existing power control bits, existing structures are utilized, which results in a simple implementation.

The transfer of a unit of information may take place for each time slot to be transmitted. The transfer may be synchronous or asynchronous with the time slots, which are transmitted in frames. Advantageously, the transfer takes place only when changes occur, for instance during a transmission gap in compressed mode or at a changeover in SSDT. During normal operation, the same information is not constantly repeated, for example.

Further advantageous aspects of the invention are apparent from the dependent claims and the following description.

BRIEF DESCRIPTION OF THE DRAWINGS

Three embodiments of the invention will now be explained with reference to the accompanying drawings, in which.

BEST MODE OF CARRYING OUT THE INVENTION

Figure 1:
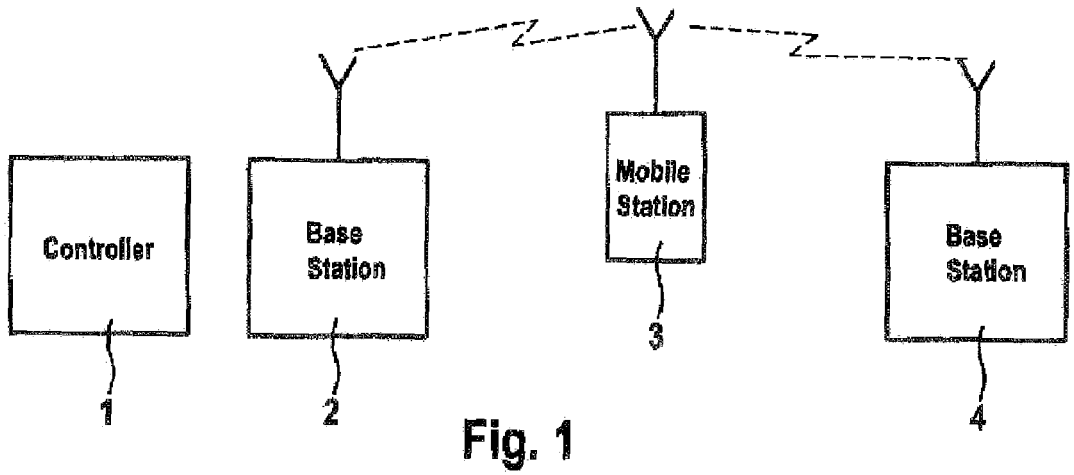
FIG. 1 is a schematic representation of a portion of a mobile radio system.

The first embodiment will now be explained with reference to FIGS. 1 to 4. FIG. 1 shows a portion of a UMTS mobile radio system. The UMTS mobile radio system comprises a controller 1, a first base station 2, a mobile station 3, and a second base station 4.

In UMTS, controller 1 is referred to as a radio network controller (RNC). It transmits subscriber data to base station 2, which CDMA-codes these data and then transmits them by radio to mobile station 3; CDMA =Code Division Multiple Access. The direction from base station 2 to mobile station 3 is called the downlink. In addition to the data, control information is transmitted to base station 2. This control information includes, for example, NBAP (Node B Application Part), control parameters, information about a transmission method, such as the so-called compressed mode. The transmission of data is unidirectional or bidirectional; the direction from mobile station 3 to base station 2 is referred to as the uplink.

In base station 2, called "node B" in UMTS, the information received from controller 1, which information is referred to as "symbols", is converted into so-called chips by CDMA coding and subsequently transmitted by radio to mobile station 3. Base station 2 serves all mobile stations within a cell. Base station 4 serves all mobile stations within another cell. The cells of base stations 2 and 4 overlap, so that conflicts may result for mobile stations located in the overlap area. By SSDT (Site Selection Diversity TPC), data communication for the respective mobile station is maintained to only one base station, while a synchronization link with transmit power control is maintained to the other.

If there are many active mobile stations in a cell, it may be necessary to provide downlink control in order to achieve an optimization with regard to throughput, transmit power, etc.

Furthermore, in the so-called compressed mode, transmission gaps must be provided, in which measurements are performed. In UMTS, a distinction is made between compressed mode method A and method B.

In base station 2, the frame-structured time-slot-formatted symbols are processed in such a way as to meet the criteria for the time-slot types to be currently used, such as SSDT, compressed mode.

In UMTS, mobile station 3 is referred to as user equipment; it may also be called a UMTS phone.

FIG. 2 shows five exemplary time-slot types.

Symbols are transmitted in frames. Each frame contains several time slots. Each time slot contains a selection of data and control information. The control information includes: TPC, TFCI, PL. TPC (Transmit Power Control) informs the mobile station of the transmit power to be used for the uplink. The better the reception at the base station, the lower the transmit power of the mobile station can be chosen to be. TFCI (Transport Format Combination Indicator) provides the mobile station with information about the transmission method. PL (Pilot) provides the mobile station with a pilot signal which serves synchronization purposes.

Figure 2A:
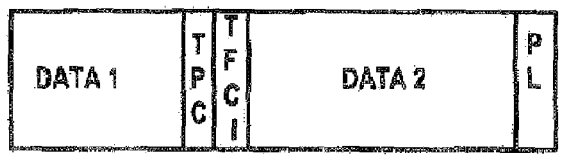
FIG. 2 shows five exemplary time-slot types.

FIG. 2a shows a first time-slot type, which serves to transmit data. In addition to DATA1 and DATA2, control information TPC, TFCI, and PL is transmitted.

Figure 2B:
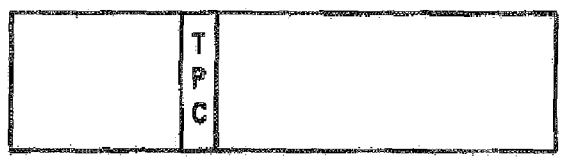

FIG. 2b shows a second time-slot type, which is transmitted as the first time slot in the transmission gap in compressed mode method B. It contains only TPC.

Figure 2C:

FIG. 2c shows a third time-slot type, which is transmitted as the last time slot in the transmission gap in compressed mode method A and method B. It contains only PL.

Figure 2D:

FIG. 2d shows a fourth time-slot type, which is transmitted in the transmission gap in compressed mode method A and method B. It contains no data and no control information, i.e., it is empty.

Figure 2E:

FIG. 2e shows a fifth time-slot type, which is transmitted to one of the base stations in SSDT. It contains TPC, TFCI, PL. To the other base station, a time slot as shown in FIG. 2a is transmitted. The fifth time slot can also be used for downlink control, e.g., for reducing the data rate under overload conditions.

The enumeration of the time-slot types is exemplary, not exhaustive. It is also possible to use time-slot types that have not been defined so far, such as a time slot containing DATA1, TPC, TFCI, PL, but not DATA2, or a time slot containing TPC and PL.

Figure 3:
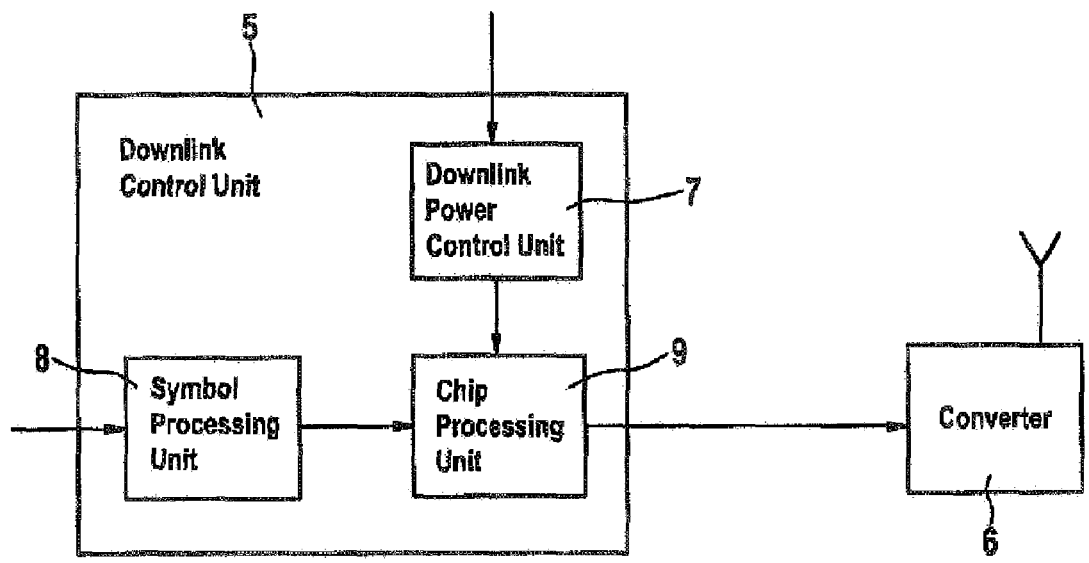
FIG. 3 is a schematic representation of a portion of a base station.

FIG. 3 shows a portion of base station 2. Base station 2 comprises a downlink control unit 5, which is disposed on a board, and a converter 6. Downlink control unit 5 contains a downlink power control unit 7, a symbol processing unit 8, and a chip processing unit 9.

Downlink power control unit 7 contains, for instance, a suitably programmed digital signal processor (DSP) or microprocessor. Unit 7 is connected to an uplink control unit. The uplink control unit receives from mobile station 3, inter alia, data, TFCI, FBI, TPC. FBI and TPC are passed on to unit 7; FBI=Feedback Indicator. From TPC, the transmit power levels of the signals to be transmitted to mobile station 3 are determined. This involves generating power control bits which are transmitted to chip processing unit 9. From FBI, measures for downlink control are derived.

Symbol processing unit 8 contains, for example, a suitably programmed DSP or microprocessor. It is connected to controller 1 and chip processing unit 9.

Chip processing unit 9 contains, for example, a suitably programmed FPGA (Field Programmable Gate Array) or ASIC (Application-Specific Integrated Circuit). The functions of chip processing unit 9 include spreading the signals to be transmitted, which is done by CDMA coding.

Converter 6 is referred to as an RF converter (RF=Radio Frequency) and serves to convert the CDMA-coded signals to radio signals.

Downlink power control unit 7 is designed to transfer to chip processing unit 9 at least one unit of information about at least one time-slot type to be transmitted. Chip processing unit 9 receives four bits abcd, which may also be referred to as "flags". Bit a can be set to 0 or 1 and indicates whether TPC is to be transmitted in the current time slot or not. Bit b can be set to 0 or 1 and indicates whether TFCI is to be transmitted in the current time slot or not. Bit c can be set to 0 or 1 and indicates whether PL is to be transmitted in the current time slot or not. Bit d can be set to 0 or 1 and indicates whether data are to be transmitted in the current slot or not. If the four-bit combination 0010 is transferred, for example, chip processing unit 9 will generate a time slot corresponding to the time-slot type of FIG. 2c. If the four-bit combination 1110 is transferred, chip processing unit 9 will generate a time slot corresponding to the time-slot type of FIG. 2e.

For compressed mode, the following applies.

The information as to when a transmission gap is to occur, the gap length, and method A or B are stored in unit 7. During normal transmission, the four-bit combination is 1111, so that time slots according to the time-slot type of FIG. 2a are generated in chip processing unit 9. During the transmission gap, the four-bit combination is 0000, so that measurements can be performed, with the following exceptions: In compressed mode method A, the four-bit combination for the last time slot of the transmission gap is 0010, so that a time slot according to the time-slot type of FIG. 2c is transmitted. In compressed mode method B, the four-bit combination for the first time slot of the transmission gap is 1000, so that a time slot according to the time-slot type of FIG. 2b is transmitted, and the four-bit combination for the last time slot of the transmission gap is 0010, so that a time slot according to the time-slot type of FIG. 2c is transmitted.

In addition, the information as to when a transmission gap is to occur, the length of the gap, and method A or B may be stored in symbol processing unit 8 in order to delete the data of the symbols during a transmission gap. If that is the case, the fourth bit position of the four-bit combination is redundant.

For SSDT, the following applies.

From FBI from the uplink, unit 7 determines whether the next time slot is to be a time slot of the type of FIG. 2a or of FIG. 2e. For a time slot of the type of FIG. 2a, the four-bit combination 1111 is chosen; for a time slot of the type of FIG. 2e, the four-bit combination 1110 is chosen.

For downlink control, the following applies. From FBI from the uplink, unit 7 determines whether data matching is to be performed. In the event of an imminent overload condition, for example, individual data packets are not transmitted. For this, time slots of the type of FIG. 2e are provided. Synchronization and transmit power control are maintained, but the data volume, and hence the load on the network, is briefly reduced such that a balanced, optimized cell usage is ensured. Thus, an attempt is made to maintain all connections within the cell with average quality and average data throughput. For a time slot of the type of FIG. 2e, a four-bit combination 1110 is generated and sent to chip processing unit 9. For connections in which the data rate is not to be reduced, the four-bit combination 1111 continues to be used.

Figure 4:
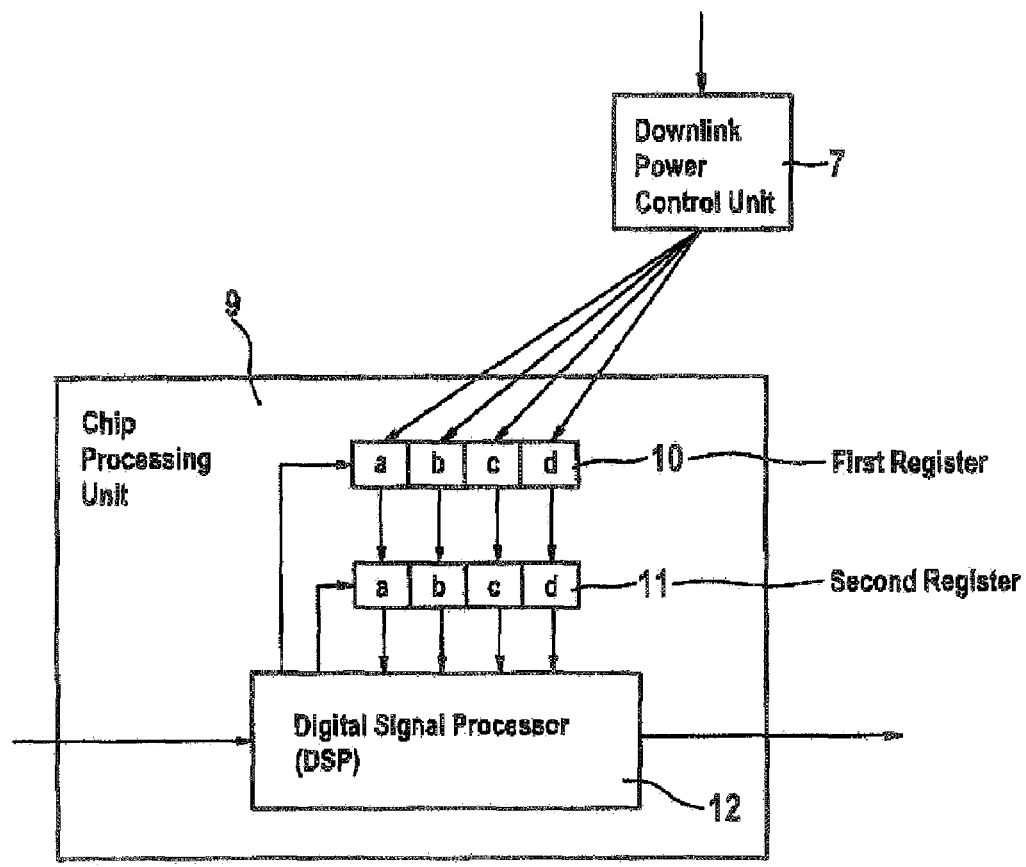
FIG. 4 is a detailed representation of the portion of the base station shown in FIG. 3.

FIG. 4 is a detailed representation of a portion of the base station 2 of FIG. 3. It shows the downlink power control unit 7 and the chip processing unit 9 of FIG. 3. Chip processing unit 9 contains a first register 10 for storing the four-bit combination abcd, a second register 11 for storing the four-bit combination abcd, and a DSP 12 for processing, e.g., spreading, the signals to be transmitted.

Unit 7 generates four-bit combinations and transfers them sequentially to register 10. The transfer takes place, for example, via a serial or parallel interface or over a bus or a bus system. For each time slot, one four-bit combination is generated, for example. At each time-slot boundary, the contents of register 10 are copied to register 11. The contents of register 11 determine the composition of the current time slot. If register 11 contains the four-bit combination 1000, for example, a time slot of the type of FIG. 2b will be generated, CDMA-coded, transferred to converter 6, and then transmitted by radio.

Instead of transferring the four-bit combination abcd from downlink power control unit 7 to chip processing unit 9 separately, this bit combination may be transferred together with the power control bits generated in unit 7. In place of separate registers 10 and 11, the registers provided for storing the power control bits may be employed.

Figure 5:
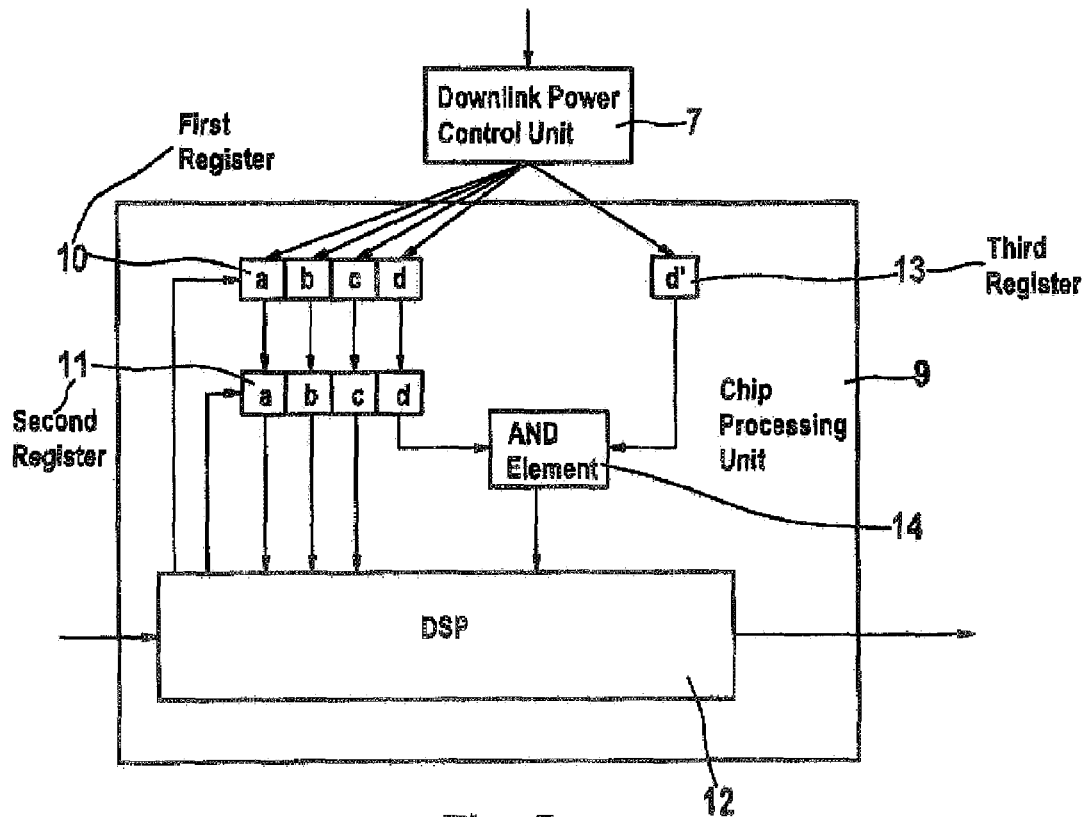
FIG. 5 is an alternative detailed representation of the portion of the base station shown in FIG. 3.

The second embodiment will now be explained with reference to FIG. 5. FIG. 5 is a detailed representation of the portion of base station 2 shown in FIG. 3. It shows the downlink power control unit 7 and the chip processing unit 9 of FIG. 3. Chip processing unit 9 contains a first register 10 for storing the four-bit combination abcd, a second register 11 fore storing the four-bit combination abcd, a DSP 12 for processing, e.g., spreading, the signals to be transmitted, a third register 13, and an AND element 14.

Unit 7 generates four-bit combinations and transfers them sequentially to register 10. The transfer takes place, for example, via a serial or parallel interface or over a bus or a bus system. For each time slot one four-bit combination is generated, for example. At each time-slot boundary, the contents of register 10 are copied to register 11.

The contents of register 11 determine the composition of the current time slot. If register 11 contains the four-bit combination 1000, for instance, a time slot of the type of FIG. 2b will be generated, CDMA-coded, transferred to converter 6, and subsequently transmitted by radio.

Instead of transferring the four-bit combination abcd from downlink power control unit 7 to chip processing unit 9 separately, this bit combination can be transferred together with the power control bits generated in unit 7. In place of separate registers 10 and 11, the registers provided for the power control bits may be employed.

Unit 7 also generates an additional bit d', which is used for downlink control purposes. By means of the four-bit combination, instructions for the next time slot can be transferred. A received four-bit combination does not become effective until transferred into register 11. To permit expedited access, register 13 is inserted, which receives the additional bit d' and makes it available undelayed. The additional bit d', which can be set to 0 or 1, indicates in a manner similar to bit d whether or not data are to be transmitted in the current time slot. Normally, bit d is 1, i.e., data are transmitted, with bit d' being 1. If the data transmission is to be interrupted as quickly as possible, bit d' will be set to 0, whereupon the data transmission is interrupted directly without delay, independently of the value of bit d.

Thus, bit d' is normally set to 1. If no data are to be transmitted, bit d can be set to 0 or bit d' can be set to 0 or both can be set to 0.

Figure 6:
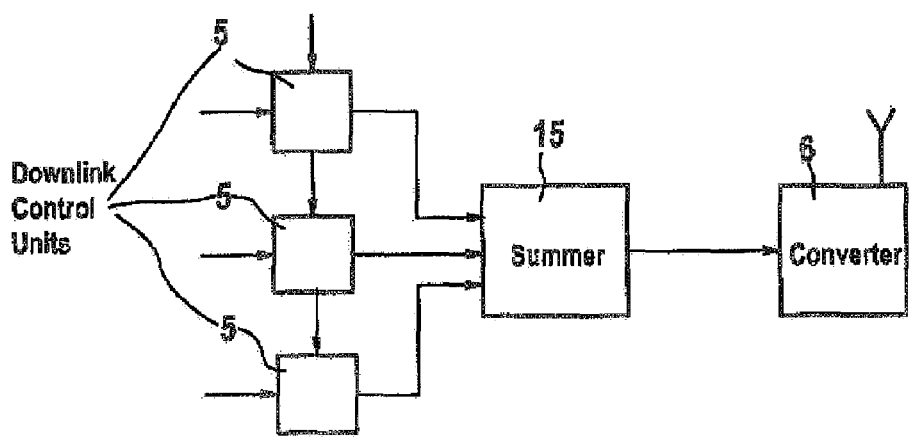
FIG. 6 is an alternative schematic representation of the portion of the base station shown in FIG. 3.

The third embodiment will now be explained with reference to FIG. 6. FIG. 6 is an alternative schematic representation of the portion of base station 2 shown in FIG. 3. The base station of FIG. 6 comprises a number of functionally similar downlink control units 5, of which three are shown. Instead of three downlink control units 5, two, four, five, six, seven, eight, nine, ten, etc. can be used. Each of the downlink control units 5 has at least one output, e.g., two, three, four, five, six, seven, eight, nine, etc. outputs. They are disposed on different boards, for example, and they all have the same number of outputs. Alternatively, at least one downlink control unit 5 has a different number of outputs. In at least one downlink control unit 5, the principle of transfer of the four-bit combination abcd or the principle of transfer of the four-bit combination abcd and the additional bit d' is applied.

The base station of FIG. 6 further comprises a summer 15 and the converter 6. Summer 15 sums the output signals of downlink control units 5 and feeds the sum to converter 6, which performs the conversion into radio signals and transmits the latter.

In the embodiments, four parameter values TPC, TFCI, PL, DATA1+2 are transferred by means of four-bit combinations abcd and, optionally, of the additional bit d'. The invention is not limited to these four parameters. It is possible to transmit more or fewer parameter values, e.g., two, three, five, six, seven, eight. Also, the invention is not limited to the provision of a separate bit for each parameter. For instance, information about the four time-slot types can be transmitted by coding with two bits. For example, the bit combination 00 is used for the time-slot type of FIG. 2a, the bit combination 01 for the time-slot type of FIG. 2b, the bit combination 10 for the time-slot type of FIG. 2c, and the bit combination 11 for the time-slot type of FIG. 2d. The time-slot types for compressed mode are thus implemented by means of two bits. If the deletion of the data in SSDT is carried out in the symbol processing unit, then SSDT, too, can be implemented by means of the two bits, i.e., the bit combination 00. For downlink control in the event of an imminent overland condition, an additional bit or another time-slot type, e.g., the type of FIGS. 2b, c, or d, could be used.

The invention claimed is:

1. A base station for a UMTS mobile radio system which serves to transmit CDMA-coded radio signals formatted in time slots, wherein a transmit power control unit is designed to transfer to a processing unit at least one unit of information about a time-slot type to be transmitted in the form of at least one four-bit combination, with each bit representing one parameter of a time-slot type.

2. A base station as set forth in claim 1, wherein at least five different time-slot types are provided for compressed mode and SSDT.

3. A base station as set forth in claim 1, wherein the transfer of a unit of information takes place for each time slot to be transmitted.

4. A base station for a UMTS mobile radio system which serves to transmit CDMA-coded radio signals formatted in time slots, wherein a transmit power control unit is designed to transfer to a processing unit at least one unit of information about a time-slot type to be transmitted in the form of at least one two-bit combination, with each bit combination representing a different time-slot type.

5. A base station as set forth in claim 4, wherein a unit of information is transferred in the form of at least one two-bit combination and together with power control bits.

6. A downlink control unit for a base station for a UMTS mobile radio system, which serves to transmit CDMA-coded radio signals formatted in time slots, characterized in that a transmit power control unit is designed to transfer to a processing unit at least one unit of information about at least one time-slot type to be transmitted in the form of at least one four-bit combination, with each bit representing one parameter of a time-slot type.

* * * * *